US012682807B2

(12) United States Patent
Pyo

(10) Patent No.: US 12,682,807 B2
(45) Date of Patent: Jul. 14, 2026

(54) VOLTAGE SETTING METHOD FOR DISPLAY DEVICE, DISPLAY DEVICE, AND ELECTRONIC DEVICE

(71) Applicant: Samsung Display Co., Ltd., Yongin-si (KR)

(72) Inventor: Si Beak Pyo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/210,714

(22) Filed: May 16, 2025

(65) Prior Publication Data

US 2026/0057815 A1 Feb. 26, 2026

(30) Foreign Application Priority Data

Aug. 23, 2024 (KR) ........................ 10-2024-0113381

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2300/0819* (2013.01); *G09G 2300/0842* (2013.01); *G09G 2320/0257* (2013.01); *G09G 2330/021* (2013.01); *G09G 2360/16* (2013.01)

(58) Field of Classification Search
CPC ......... G09G 3/3233; G09G 2320/0233; G09G 2320/0242; G09G 2320/0247
See application file for complete search history.

(56) References Cited

U.S. PATENT DOCUMENTS

| | | | | |
|---|---|---|---|---|
| 10,522,075 B2 * | 12/2019 | Pyo | ....................... | G09G 3/3233 |
| 10,878,777 B2 * | 12/2020 | Hwang | ..................... | G09G 5/10 |
| 10,997,909 B2 * | 5/2021 | Pyo | ....................... | G09G 3/3233 |
| 11,322,075 B2 * | 5/2022 | Pyo | .......................... | G09G 5/10 |
| 11,804,173 B1 * | 10/2023 | Pyo | .......................... | G09G 3/32 |

(Continued)

FOREIGN PATENT DOCUMENTS

| | | |
|---|---|---|
| KR | 10-2139693 B1 | 7/2020 |
| KR | 10-2537993 B1 | 6/2023 |
| KR | 10-2556467 B1 | 7/2023 |

*Primary Examiner* — Van N Chow
(74) *Attorney, Agent, or Firm* — Womble Bond Dickinson (US) LLP

(57) ABSTRACT

A voltage setting method for a display device includes applying a first black data voltage corresponding to a first maximum luminance of a plurality of maximum luminances while measuring a luminance of the display device; setting a second offset for a second maximum luminance of the plurality of maximum luminances, which corresponds to a first luminance period in which an emission duty ratio is varied, the second offset being a difference between the first black data voltage and a second black data voltage corresponding to the second maximum luminance; similarly setting a third offset for a third maximum luminance of the plurality of maximum luminances; and setting offsets corresponding to remaining maximum luminances except the first to third maximum luminances, based on the first black data voltage for the first maximum luminance, the second offset for the second maximum luminance, and the third offset for the third maximum luminance.

20 Claims, 12 Drawing Sheets

(56) References Cited

U.S. PATENT DOCUMENTS

| | | | | | |
|---|---|---|---|---|---|
| 2004/0235851 | A1* | 11/2004 | Zhao | C07D 491/04 | 514/250 |
| 2013/0169693 | A1* | 7/2013 | Pyo | G09G 3/3225 | 345/76 |
| 2015/0138251 | A1 | 5/2015 | Pyo | | |
| 2016/0189676 | A1* | 6/2016 | Pyo | G09G 3/3291 | 345/82 |
| 2022/0343848 | A1* | 10/2022 | Jeon | G09G 3/3233 | |
| 2024/0355266 | A1* | 10/2024 | Wu | G09G 3/32 | |

* cited by examiner

<ADDRESS SCAN>

FIG. 9

| | MAXIMUM LUMINANCE (DBV [Nits]) | EMISSION DUTY RATIO | FIRST POWER VOLTAGE | | BLACK DATA VOLTAGE | | OFFSET | |
|---|---|---|---|---|---|---|---|---|
| | | | TEST | SETTING | TEST | SETTING | TEST | SETTING |
| ML1 → | 2175 | 89.19% | – | –4.90 | 4.5~6.0 | A | – | 0 |
| | 1600 | 89.19% | – | –4.90 | – | | – | FIRST INTERPOLATION (BASED ON FIRST POWER VOLTAGE) |
| | 1200 | 89.19% | – | –4.50 | – | | – | |
| ML4 → | 650 | 89.19% | O (–3.2~–3.7) | –3.20 | – | | – | |
| | 300 | 89.19% | – | –2.50 | – | | – | |
| | 200 | 89.19% | – | –2.30 | – | | – | |
| ML2 → | 100 | 89.19% | – | –2.10 | – | | O (LUT) | B |
| | 90 | 80.27% | – | –2.10 | – | | – | SECOND INTERPOLATION (BASED ON EMISSION DUTY RATIO) |
| | 60 | 53.51% | – | –2.10 | – | | – | |
| | 30 | 26.76% | – | –2.10 | – | | – | |
| | 15 | 13.38% | – | –2.10 | – | | – | |
| ML3 → | 10 | 8.92% | – | –2.10 | – | | O (LUT) | C |
| | 4 | 8.92% | – | –2.10 | – | | – | |

FIG. 12

LUT

| Sweep Step | OFFSET | | |
|---|---|---|---|
| | R | G | B |
| 1 | 0.800 | 1.500 | 2.200 |
| 2 | 0.720 | 0.720 | 2.090 |
| 3 | 0.647 | 0.647 | 1.984 |
| 4 | 0.579 | 0.579 | 1.883 |
| 5 | 0.518 | 0.518 | 1.786 |
| 6 | 0.462 | 0.462 | 1.693 |
| 7 | 0.411 | 0.411 | 1.604 |
| 8 | 0.365 | 0.365 | 1.519 |
| 9 | 0.323 | 0.323 | 1.438 |
| 10 | 0.286 | 0.286 | 1.360 |
| 11 | 0.252 | 0.252 | 1.286 |
| 12 | 0.222 | 0.222 | 1.216 |
| 13 | 0.195 | 0.195 | 1.148 |
| 14 | 0.171 | 0.171 | 1.084 |
| 15 | 0.149 | 0.149 | 1.023 |
| 16 | 0.130 | 0.130 | 0.964 |
| 17 | 0.113 | 0.113 | 0.909 |
| 18 | 0.098 | 0.098 | 0.856 |
| 19 | 0.085 | 0.085 | 0.806 |
| 20 | 0.074 | 0.074 | 0.759 |
| 21 | 0.063 | 0.063 | 0.713 |
| 22 | 0.054 | 0.054 | 0.671 |
| 23 | 0.047 | 0.047 | 0.630 |
| 24 | 0.040 | 0.040 | 0.592 |
| 25 | 0.034 | 0.034 | 0.555 |

CASE1 (A = 5.6)

| Sweep Step | BLACK DATA VOLTAGE | | |
|---|---|---|---|
| | R | G | B |
| 1 | 4.800 | 4.100 | 3.400 |
| 2 | 4.800 | 4.205 | 3.510 |
| 3 | 4.953 | 4.304 | 3.616 |
| 4 | 5.021 | 4.397 | 3.717 |
| 5 | 5.082 | 4.484 | 3.814 |
| 6 | 5.138 | 4.565 | 3.907 |
| 7 | 5.189 | 4.642 | 3.996 |
| 8 | 5.235 | 4.714 | 4.081 |
| 9 | 5.277 | 4.781 | 4.162 |
| 10 | 5.314 | 4.843 | 4.240 |
| 11 | 5.348 | 4.902 | 4.314 |
| 12 | 5.378 | 4.956 | 4.384 |
| 13 | 5.405 | 5.007 | 4.452 |
| 14 | 5.429 | 5.054 | 4.516 |
| 15 | 5.451 | 5.098 | 4.577 |
| 16 | 5.470 | 5.139 | 4.636 |
| 17 | 5.487 | 5.177 | 4.691 |
| 18 | 5.502 | 5.212 | 4.744 |
| 19 | 5.515 | 5.244 | 4.794 |
| 20 | 5.526 | 5.274 | 4.841 |
| 21 | 5.537 | 5.302 | 4.887 |
| 22 | 5.546 | 5.328 | 4.929 |
| 23 | 5.553 | 5.351 | 4.970 |
| 24 | 5.560 | 5.373 | 5.008 |
| 25 | 5.566 | 5.393 | 5.045 |

VOLTAGE SETTING METHOD FOR DISPLAY DEVICE, DISPLAY DEVICE, AND ELECTRONIC DEVICE

CROSS-REFERENCE TO RELATED APPLICATION

The present application claims priority to and the benefit of Korean Patent Application No. 10-2024-0113381, filed on Aug. 23, 2024, in the Korean Intellectual Property Office, the entire disclosure of which is incorporated herein by reference.

BACKGROUND

1. Field

Aspects of embodiments of the present disclosure generally relate to a voltage setting method for a display device, a display device, and an electronic device.

2. Description of the Related Art

With the development of information technologies, the importance of the display device, which is a connection medium between a user and information increases. Accordingly, display devices such as a liquid crystal display device and an organic light emitting display device are increasingly used.

In order to reduce manufacturing costs, a plurality of display devices may be simultaneously formed on a large-area mother substrate, and be separated into individual display devices by scribing the mother substrate.

However, these individual display devices may include elements having different driving characteristics based on their positions on the mother substrate or due to other causes. Therefore, when voltages having the same magnitude are collectively set in all the display devices, a problem may occur in that some of the display devices may not emit light with a luminance corresponding to a grayscale.

Conventionally, voltages were set by increasing a margin between the applied voltages. However, unnecessary power consumption of individual display devices may be increased.

The above information disclosed in this Background section is only for enhancement of understanding of the background of the invention and therefore it may contain information that does not form the prior art.

SUMMARY

Aspects of some embodiments of the present disclosure are directed to a voltage setting method for a display device, a display device, and an electronic device, which can prevent black floating or substantially reduce the likelihood of black floating from occurring.

According to some embodiments, there is provided a voltage setting method for a display device displaying an image, the voltage setting method including: applying a first black data voltage corresponding to a first maximum luminance of a plurality of maximum luminances to the display device while measuring a display luminance of the display device; setting a second offset for a second maximum luminance of the plurality of maximum luminances, which corresponds to a first luminance period in which an emission duty ratio is varied, the second offset being a difference between the first black data voltage and a second black data voltage corresponding to the second maximum luminance; setting a third offset for a third maximum luminance of the plurality of maximum luminances, which corresponds to a first luminance period in which an emission duty ratio is varied, the third offset being a difference between the first black data voltage and a third black data voltage corresponding to the third maximum luminance; and setting offsets corresponding to remaining maximum luminances except the first to third maximum luminances, based on the first black data voltage for the first maximum luminance, the second offset for the second maximum luminance, and the third offset for the third maximum luminance.

In some embodiments, the voltage setting method of claim 1, may further include: before the first black data voltage is applied, applying first power voltages corresponding to a fourth maximum luminance. A same first power voltage may be set for maximum luminances smaller than or equal to the second maximum luminance, and varying first power voltages may be set for at least some of maximum luminances larger than the second maximum luminance among the maximum luminances.

In some embodiments, the same emission duty ratio may be set for maximum luminances larger than or equal to the second maximum luminance among the maximum luminances, and different emission duty ratios may be set for at least some of maximum luminances smaller than the second maximum luminance among the maximum luminances.

In some embodiments, in setting of offsets for maximum luminances in a second luminance period, which are smaller than the first maximum luminance and are larger than the second maximum luminance, a first interpolation based on the first power voltages may be performed using a first offset corresponding to the first maximum luminance and the second offset corresponding to the second maximum luminance.

In some embodiments, the first interpolation may be performed to be in proportion to a difference between first power voltages for the maximum luminances in the second luminance period.

In some embodiments, in setting of offsets for maximum luminances in a first luminance period, which are smaller than the second maximum luminance and are larger than the third maximum luminance, a second interpolation based on the emission duty ratio may be performed using the second offset corresponding to the second maximum luminance and the third offset corresponding to the third maximum luminance.

In some embodiments, the second interpolation may be performed to be in proportion to a difference between emission duty ratios for the maximum luminances in the first luminance period.

In some embodiments, the setting of the offset for each of the second maximum luminance and the third maximum luminance may include: determining arbitrary black data voltages for the second maximum luminance, based on arbitrary offsets; and determining a second black data voltage for the second maximum luminance by repeatedly testing the arbitrary black data voltages for the second maximum luminance by applying the arbitrary black data voltages to the display device and determining whether a black image is displayed, and the second offset for the second maximum luminance may be determined according to the second black data voltage.

In some embodiments, the determining of the second black data voltage may include applying an arbitrary black data voltage corresponding to an arbitrary offset selected for a test among the arbitrary offsets; measuring a display luminance according to the arbitrary black data voltage; determining whether the display luminance according to the arbitrary black data voltage is smaller than a reference luminance; and changing the offset to the arbitrary offset for the test when the display luminance according to the arbitrary black data voltage is larger than or equal to the reference luminance.

In some embodiments, in changing the arbitrary offset, the arbitrary offset for the test may be sequentially selected among the arbitrary offsets in an order from a high luminance to a low luminance.

In some embodiments, in changing of the arbitrary offset, a display luminance measured corresponding to the arbitrary offset and machine learning on the second offset may be used.

In some embodiments, the setting of the offset of each of the second maximum luminance and the third maximum luminance may further include determining arbitrary black data voltages for the third maximum luminance, based on the arbitrary offsets; and setting a third black data voltage for the third maximum luminance by repeatedly testing the arbitrary black data voltages for the third maximum luminance such that a black image is displayed, and the third offset for the third maximum luminance may be determined according to the third black data voltage.

In some embodiments, the display device may include pixels emitting lights of different colors, and the first black data voltage may be uniformly applied to each of the pixels, and the second offset corresponding to the second maximum luminance may be set non-uniformly among the pixels.

In some embodiments, a black data voltage corresponding to each of the maximum luminances may be determined by adding a corresponding offset among the offsets to the first black data voltage.

In some embodiments, a black data voltage for each of the maximum luminances may be determined by adding the corresponding offset among the offsets and a margin value to the first black data voltage.

In some embodiments, the first maximum luminance may be larger than each of the second maximum luminance and the third maximum luminance, and may be largest among the maximum luminances.

In some embodiments, at least one maximum luminance for which a smallest emission duty ratio is set among emission duty ratios may be set as the third maximum luminance.

In some embodiments, when a number of the at least one maximum luminance is two or more, a largest maximum luminance among the at least one maximum luminance may be set as the third maximum luminance.

In some embodiments, a display device may include a pixel unit including pixels each including a light emitting element; and a data driver configured to provide data voltages to the pixels based on grayscales, wherein the data voltages include a black data voltage corresponding to a minimum grayscale among the grayscales, wherein the black data voltage is configured to be varied according to a maximum luminance, and wherein the black data voltage is set by the voltage setting method described previously Aspects of some embodiments of the present disclosure are directed to an electronic device including: a processor configured to provide input image data; and a display device configured to display an image based on the input image data, wherein the display device includes: a pixel unit including pixels each including a light emitting element; and a data driver configured to provide data voltages to the pixels based on grayscales, wherein the data voltages include a black data voltage corresponding to a minimum grayscale among the grayscales, wherein the black data voltage is configured to be varied according to a maximum luminance, and wherein the black data voltage is set by the voltage setting method for a display device of claim 1.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawings, dimensions may be exaggerated for clarity of illustration. Like reference numerals refer to like elements throughout.

FIGS. 9 to 11 are diagrams illustrating the voltage setting method shown in FIG. 8 according to some embodiments of the present disclosure.

FIG. 12 is a diagram illustrating an offset according to some embodiments of the present disclosure.

DETAILED DESCRIPTION

Figure 1:
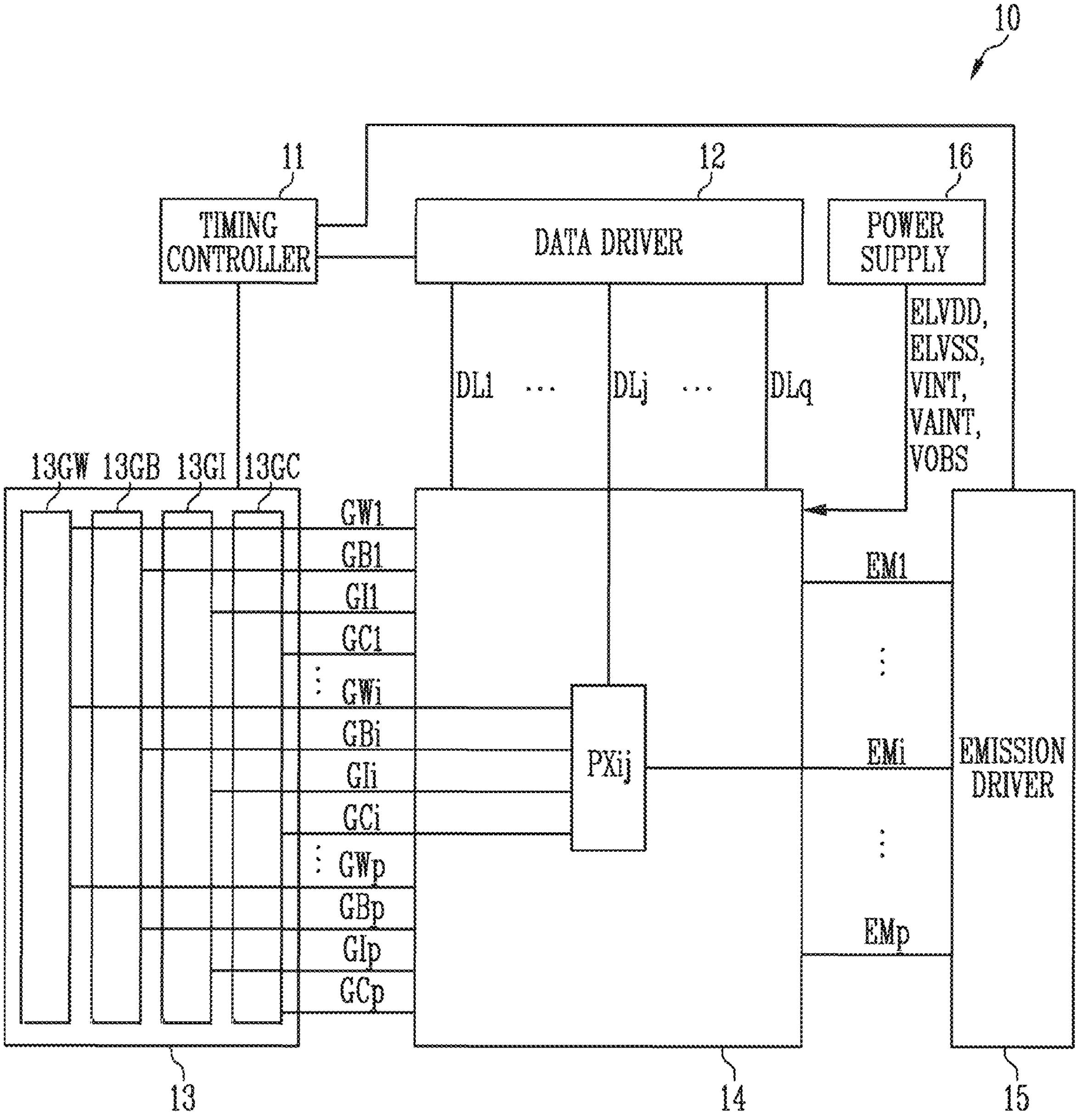
FIG. 1 is a diagram illustrating a display according to some embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device according to some embodiments of the present disclosure.

Referring to FIG. 1, the display device 10 may include a timing controller 11, a data driver 12, a scan driver 13, a pixel unit 14 (e.g., a display panel), an emission driver 15, and a power supply 16.

The timing controller 11 may receive grayscales for an input image (e.g., an input frame). The grayscales may include a first color grayscale, a second color grayscale, and a third color grayscale. The first color grayscale may be a grayscale for expressing a first color, the second color grayscale may be a grayscale for expressing a second color, and the third color grayscale may be a grayscale for expressing a third color.

Also, the timing controller 11 may receive a control signal for an image. The control signal may include a horizontal synchronization signal, a vertical synchronization signal, and a data enable signal. The vertical synchronization signal may include a plurality of pulses, and may indicate that a previous frame period is ended and a current frame period is started with respect to a time at which each of the pulses is generated. An interval between adjacent pulses of the vertical synchronization signal may correspond to one frame period. The horizontal synchronization signal may include a plurality of pulses, and may indicate that a previous horizontal period is ended and a new horizontal period is started with respect to a time at which each of the pulses is generated. An interval between adjacent pulses of the horizontal synchronization signal may correspond to one horizontal period. The data enable signal may have an enable level with respect to specific horizontal periods and have a disable level in the other periods. When the data enable signal is at the enable level, color grayscales may be supplied in corresponding periods.

The timing controller 11 may provide the data driver 12 with grayscales rendered or corrected to be suitable for specifications of the display device 10. Also, the timing controller 11 may provide the scan driver 13 with a clock signal, a scan start signal, and the like. The timing controller 11 may provide the emission driver 15 with a clock signal, an emission stop signal, and the like.

The data driver 12 may generate data voltages to be provided to data lines DL1, . . . , DLj, . . . , and DLq, using grayscales and control signals, which are received from the timing controller 11. The data driver 12 may sample grayscales, using a clock signal, and apply data voltages corresponding to the grayscales to the data lines DL1 to DLq in units of pixel rows. Here, q may be an integer greater than 2, and j may be an integer greater than 1 and smaller than q.

Magnitudes of the data voltages may vary according to a corresponding grayscale. The data voltages may include a black data voltage. The black data voltage may be a data voltage which is to be written to a pixel when the pixel displays a black image. For example, the black data voltage may correspond to a minimum grayscale (e.g., grayscale 0).

The magnitudes of the data voltages may vary according to a maximum luminance). The maximum luminance may be a luminance of light emitted from pixels set to a maximum grayscale (e.g., grayscale 255 when grayscales are expressed with 8 bits). For example, the maximum luminance may be a luminance of white light generated as all pixels of the pixel unit 14 emit light to correspond to a white grayscale. A unit of luminance may be nits. The maximum luminance may be referred to as a display brightness value. The maximum luminance may be manually set by manipulation of a user on the display device 10, or be automatically set by an algorithm linked with an illumination sensor or the like. For example, a maximum value (e.g., a first set value or a maximum value) of the maximum luminance may be about 2175 nits, and another set value (e.g., a second set value or a minimum value) of the maximum luminance may be about 4 nits. The first set value and the second set value of the maximum luminance may be variously set to suitable values. Even with respect to the same grayscale, a data voltage varies according to the maximum luminance, and therefore, an emission luminance of the pixel may also vary accordingly.

The scan driver 13 may include first to fourth scan drivers 13GW, 13GB, 13GI, and 13GC. The first scan driver 13GW may provide first scan signals to first scan lines GW1, . . . , GWi, . . . , and GWp. Here, p may be an integer greater than 2, and i may be an integer greater than 1 and smaller than p. The second scan driver 13GB may provide second scan signals to second scan lines GB1, . . . , GBi, . . . , and GBp. The third scan driver 13GI may provide third scan signals to third scan lines GI1, . . . , GIi, . . . , GIp. The fourth scan driver 13GC may provide fourth scan signals to fourth scan lines GC1, . . . , GCi, . . . , and GCp.

For example, the first scan driver 13GW may generate the first scan signals to be supplied to the first scan lines GW1 to GWp by receiving at least one scan clock signal and a scan start signal from the timing controller 11. The first scan driver 13GW may sequentially provide the first scan signals having a pulse of a turn-on level to the first scan lines GW1 to GWp. For example, the first scan driver 13GW may be configured in the form of shift registers, and may generate the first scan signals in a manner that sequentially transfers the scan start signal in the form of a pulse of a turn-on level to a next scan stage under the control of the scan clock signal.

Each of the second scan driver 13GB, the third scan driver 13GI, and the fourth scan driver 13GC may be configured similarly to the first scan driver 13GW, and therefore, overlapping descriptions will be omitted. In some embodiments, at least some of the first to fourth scan drivers 13GW, 13GB, 13GI, and 13GC may be integrated. For example, when pulses have the same polarity and the same width or substantially the same width, two or more scan drivers may be integrated. For example, referring to FIG. 5 in advance, a pulse of a turn-on level, which is applied to a third scan line GIi at a time t2*a*, and a pulse of a turn-on level, which is applied to a fourth scan line GCi at a time t3*a*, may have the same polarity and the same width or substantially the same width, and therefore, the third scan driver 13GI and the fourth scan driver 13GC may be integrally configured.

The emission driver 15 may generate emission signals to be provided to emission lines EM1, . . . , EMi, . . . , and EMp by receiving at least one emission clock signal and an emission stop signal from the timing controller 11. The emission driver 15 may sequentially provide the emission signals having a pulse of a turn-off level to the emission lines EM1 to EMp. For example, the emission driver 15 may be configured in the form of shift registers, and may generate the emission signals in a manner which sequentially transfers the emission stop signal in the form of a pulse of a turn-off level to a next emission stage under the control of the emission clock signal.

In FIG. 1, it is illustrated that the number of each of the first scan lines GW1 to GWp, the second scan lines GB1 to GBp, the third scan lines GI1 to GIp, the fourth scan lines GC1 to GCp, and the emission lines EM1 to EMp is p.

However, in some embodiments, the number of at least one of the second scan lines GB1 to GBp, the third scan lines GI1 to GIp, the fourth scan lines GC1 to GCp, and the emission lines EM1 to EMp may be p/2 or less. For example, two adjacent pixel rows may share one second scan line. Similarly, two adjacent pixel rows may share one third scan line, one fourth scan line, or one emission line. The same pixel row means pixels connected to the same first scan line.

The pixel unit 14 (or a display panel) may include pixels. Each pixel PXij may be connected to a corresponding data line DLj, corresponding scan lines GWi, GBi, GIi, and GCi, and a corresponding emission line EMi. Each pixel PXij may include a light emitting element emitting light, based on a received data voltage.

The pixel unit 14 may include first pixels emitting light of the first color, second pixels emitting light of the second color, and third pixels emitting light of the third color. The first color, the second color, and the third color may be different colors. For example, the first color may be one color among red, green, and blue, the second color may be another color different from the first color among red, green, and blue, and the third color may be the other color different from the first color and the second color among red, green, and blue. In addition, magenta, cyan, and yellow instead of red, green, and blue may be used as the first to third colors. Hereinafter, for convenience of description, it is assumed that the first color is red, the second color is green, and the third color is blue.

The pixels of the pixel unit 14 may be arranged in various forms such as diamond PENTILE™, RGB-stripe, S-stripe, real RGB, and normal PENTILE™.

The power supply 16 may provide voltages commonly supplied to the pixels of the pixel unit 14. For example, the power supply 16 may provide a first power voltage ELVSS, a second power voltage ELVDD, an initialization voltage VINT, an anode initialization voltage VAINT, and a bias voltage VOBS. For example, the power supply 16 may be a power management integrated circuit (PMIC). For example, the power supply 16 may be configured with a plurality of DC-DC converters.

In some embodiments, the timing controller 11 and the data driver 12 may be integrated into one integrated circuit. In addition, the timing controller 11, the data driver 12, and the power supply 16 may be integrated into one integrated circuit. In addition, the timing controller 11, the data driver 12, the power supply 16, the scan driver 13, and the emission driver 15 may be integrated into one integrated circuit. As such, whether components are to be configured integrally or separately may be variously determined according to embodiments.

Figure 2:
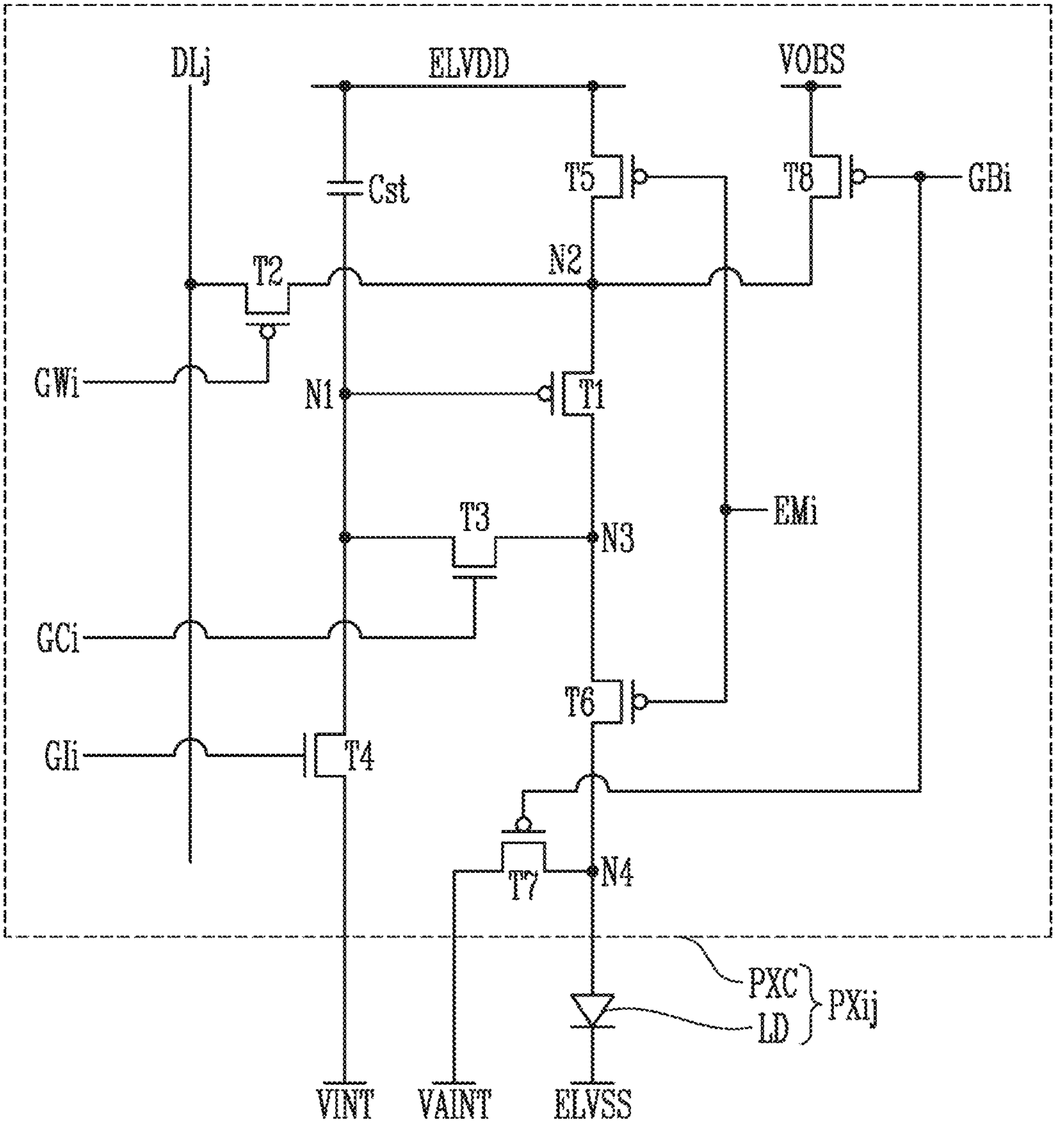
FIG. 2 is a diagram illustrating a pixel included in the display device shown in FIG. 1 according to some embodiments of the present disclosure.

FIG. 2 is a diagram illustrating the pixel included in the display device shown in FIG. 1 according to some embodiments of the present disclosure.

Referring to FIG. 2, a pixel PXij may include a pixel circuit PXC and a light emitting element LD. The pixel circuit PXC may include transistors T1, T2, T3, T4, T5, T6, T7, and T8 and a storage capacitor Cst.

The pixel PXij may be located on an ith pixel row and be located on a jth pixel column, where i and j are integers greater than zero. The pixel PXij may be a first pixel for expressing a first color. A second pixel for expressing a second color and a third pixel for expressing a third color may be configured identically to the first pixel, and therefore, overlapping descriptions will be omitted.

P-type transistors may be poly-silicon semiconductor transistors. In the poly-silicon semiconductor transistor, a channel of an active layer may include a poly-silicon semiconductor. For example, the poly-silicon semiconductor transistor may be a Low Temperature Poly-Silicon (LTPS) thin film transistor. The poly-silicon semiconductor transistor has a relatively high electron mobility, and has a fast driving characteristic according to the relatively high electron mobility.

N-type transistors may be oxide semiconductor transistors. In the oxide semiconductor transistor, a channel of an active layer may include an oxide semiconductor. For example, the oxide semiconductor transistor may be a Low Temperature Polycrystalline Oxide (LTPO) thin film transistor. The oxide semiconductor transistor has a relatively low charge mobility as compared with the poly-silicon semiconductor transistor. Therefore, an amount of leakage current generated in a turn-off state of the oxide semiconductor transistors may be small as compared with the poly-silicon semiconductor transistor.

A gate electrode of a first transistor T1 may be connected to a first node N1, a first electrode of the first transistor T1 may be connected to a second node N2, and a second electrode of the first transistor T1 may be connected to a third node N3. The first transistor T1 may be a driving transistor. The first transistor T1 may be a P-type transistor.

A gate electrode of a second transistor T2 may be connected to a first scan line GWi, a first electrode of the second transistor T2 may be connected to a data line DLj, and a second electrode of the second transistor T2 may be connected to the second node N2.

The first scan driver 13GW (see, e.g., FIG. 1) may provide a first scan signal of a turn-on level, which determines a time at which the pixel PXij receives a data voltage. For example, the second transistor T2 receiving the first scan signal of the turn-on level may be turned on. The second transistor T2 may apply, to the second node N2, a data voltage applied to the data line DLj.

A gate electrode of a third transistor T3 may be connected to a fourth scan line GCi, a first electrode of the third transistor T3 may be connected to the first node N1, and a second electrode of the third transistor T3 may be connected to the third node N3. The third transistor T3 may be a diode connection transistor. The third transistor T3 may be an N-type transistor.

A gate electrode of a fourth transistor T4 may be connected to a third scan line GIi, a first electrode of the fourth transistor T4 may be connected to the first node N1, and a second electrode of the fourth transistor T4 may receive the initialization voltage VINT. The fourth transistor T4 may be a gate initialization transistor. The fourth transistor T4 may be an N-type transistor.

A gate electrode of a fifth transistor T5 may be connected to an emission line EMi, a first electrode of the fifth transistor T5 may receive the second power voltage ELVDD, and a second electrode of the fifth transistor T5 may be connected to the second node N2. The fifth transistor T5 may be a first emission control transistor. The fifth transistor T5 may be a P-type transistor.

A gate electrode of a sixth transistor T6 may be connected to the emission line EMi, a first electrode of the sixth transistor T6 may be connected to the third node N3, and a second electrode of the sixth transistor T6 may be connected to a fourth node N4. The sixth transistor T6 may be a second emission control transistor. The sixth transistor T6 may be a P-type transistor.

A gate electrode of a seventh transistor T7 may be connected to a second scan line GBi, a first electrode of the seventh transistor T7 may receive the anode initialization voltage VAINT, and a second electrode of the seventh transistor T7 may be connected to the fourth node N4. The seventh transistor T7 may be an anode initialization transistor. The seventh transistor T7 may be a P-type transistor. A magnitude of the anode initialization voltage VAINT may be different from a magnitude of the initialization voltage VINT.

The anode initialization voltage VAINT may be differently set according to a kind of the light emitting element LD. A difference in emission start time may exist according to the kind of the light emitting element LD, and a color smear phenomenon may occur due to the difference in emission start time. For example, magnitudes of an anode initialization voltage VAINT for a light emitting element LD of the first color, an anode initialization voltage VAINT for a light emitting element LD of the second color, and an anode initialization voltage VAINT for a light emitting element LD of the third color may be set to be different from one another. In some other embodiments, anode initialization voltages VAINT for light emitting elements LD of two colors may be set to be the same or substantially the same, and an anode initialization voltage VAINT for a light emitting element LD of the other color may be set to be different from the anode initialization voltages VAINT for the light emitting elements LD of the two colors. In still some other embodiments, anode initialization voltages VAINT for all light emitting elements LD may be set to be the same or substantially the same. Accordingly, the difference in emission start time between the light emitting elements LD of the respective colors may be adjusted, thereby preventing the color smear phenomenon or substantially reducing the likelihood of it occurring. As used herein, "an enable level" or "a turn-on level" of a signal may refer to a voltage level sufficient to activate/turn on a transistor to which the signal is applied, and "a disable level" or "a turn-off level" of the signal may refer to a voltage level that can deactivate/turn off a transistor to which the signal is applied. For example, when the signal is applied to a gate of an N-channel Metal-Oxide-Semiconductor (NMOS) transistor, the "enable level" may refer to a voltage greater than or equal to the threshold voltage (Vth) of the NMOS transistor, and the "disable level" may refer to a voltage less than the threshold voltage (Vth) of the NMOS transistor. The levels may be reversed when the signal is applied to a P-channel Metal-Oxide-Semiconductor (PMOS) transistor.

The second scan driver 13GB may provide a second scan signal of a turn-on level, which determines a timing at which an anode voltage of the light emitting element LD is initialized. For example, the second transistor T7 receiving the second scan signal of the turn-on level may be turned on, and the anode initialization voltage VAINT may be applied to an anode of the light emitting element LD, so that the anode voltage of the light emitting element LD is initialized to the anode initialization voltage VAINT.

A gate electrode of an eighth transistor T8 may be connected to the second scan line GBi, a first electrode of the eighth transistor T8 may receive the bias voltage VOBS, and a second electrode of the eighth transistor T8 may be connected to the second node N2. The eighth transistor T8 may be a bias transistor. The eighth transistor T8 may be a P-type transistor.

A first electrode of the storage capacitor Cst may receive the second power voltage ELVDD, and a second electrode of the storage capacitor Cst may be connected to the first node N1.

The anode of the light emitting element LD may be connected to the fourth node N4, and a cathode of the light emitting element LD may receive the first power voltage ELVSS. The light emitting element LD may emit light of one of the first color, the second color, and the third color. The light emitting element LD may be a light emitting diode. The light emitting element LD may be configured as an organic light emitting diode, an inorganic light emitting diode, a quantum dot/well light emitting diode, or the like. In some embodiments, one light emitting element LD is provided in each pixel. However, in some other embodiments, a plurality of light emitting elements may be provided in each pixel. The plurality of light emitting elements may be connected in series, parallel, series/parallel, or the like.

Figure 3:
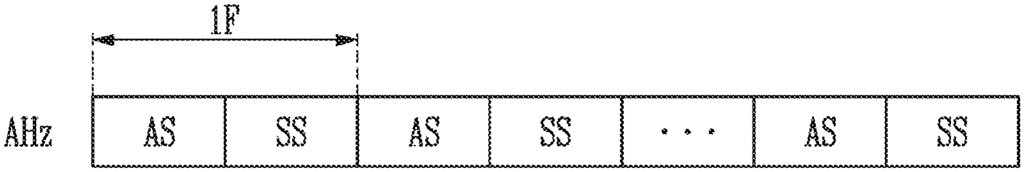
FIGS. 3 and 4 are diagrams illustrating a display frequency change according to some embodiments of the present disclosure.
Figure 4:
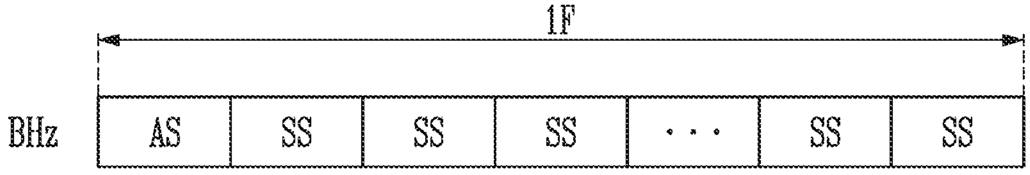

FIGS. 3 and 4 are diagrams illustrating a display frequency change according to some embodiments of the present disclosure.

Referring to FIGS. 1 to 4, the display device 10 may support a Variable Refresh Rate (VRR). A refresh rate is a frequency at which a data voltage is written to the pixel PXij, and is referred to as a screen scan rate or a screen refresh rate. The refresh rate may represent a number of image frames reproduced for one second.

For example, the pixel unit 14 may display an image at a first frequency (e.g., A Hz) in a first mode (see, e.g., FIG. 3), and display an image at a second frequency (e.g., B Hz) lower than the first frequency (A Hz) in a second mode (see, e.g., FIG. 4).

For example, each frame period 1F in the first mode may include one address scan period AS and one self-scan period SS with respect to each pixel PXij. For example, each frame period 1F in the second mode may include one address scan period AS and a plurality of self-scan periods SS with respect to each pixel PXij. As the second frequency (B Hz) becomes smaller, the number of self-scan periods SS included in one frame period 1F may increase. In some other embodiments, each frame period 1F in a third mode may include only one address scan period AS with respect to each pixel PXij, and include no self-scan period SS.

The address scan period AS is a period in which a data voltage is written to the pixel PXij. The address scan period AS may be referred to as a data programming period in which a data voltage is received from the data line DLj.

The self-scan period SS is a period in which no data voltage is written to the pixel PXij. During an emission period of the self-scan period SS, the pixel PXij may emit light, using the data voltage written in the address scan period AS. A length of the self-scan period SS may be equal to a length of the address scan period AS.

Figure 5:
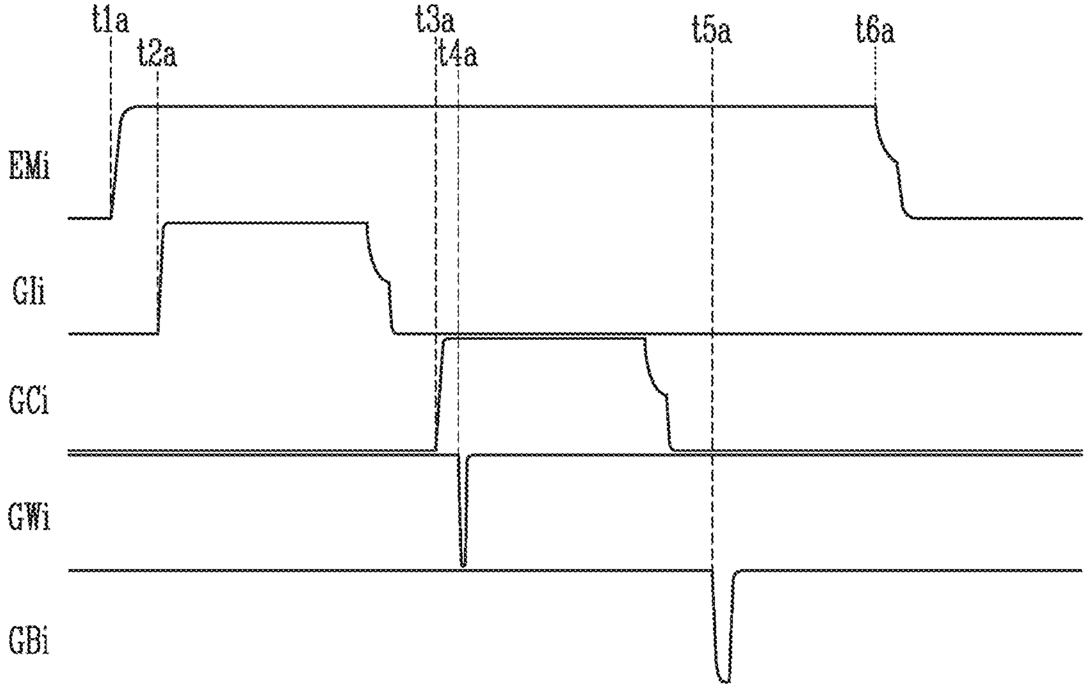
FIG. 5 is a diagram illustrating an address scan period according to some embodiments of the present disclosure.

FIG. 5 is a diagram illustrating an address scan period according to some embodiments of the present disclosure.

Referring to FIGS. 2 and 5, at a time t1*a*, as an emission signal of a turn-off level (e.g., a high level) is applied to the emission line EMi, the fifth transistor T5 and the sixth transistor T6 may be turned off, so that the pixel PXij is in a non-emission state.

At a time t2*a*, as a third scan signal of a turn-on level (e.g., a high level) is applied to the third scan line GIi, the fourth transistor T4 may be turned on. Accordingly, the initialization voltage VINT may be applied to the first node N1. The initialization voltage VINT may be a sufficiently low voltage, and may allow the first transistor T1 to be on-biased.

At a time t3*a*, as a fourth scan signal of a turn-on level (e.g., a high level) is applied to the fourth scan line GCi, the third transistor T3 may be turned on. Therefore, the first transistor T1 may be in a diode-connection state in which a drain electrode and the gate electrode thereof are connected to each other.

At a time t4*a*, as a scan signal of a turn-on level (e.g., a low level) is applied to the first scan line GWi, the second transistor T2 may be turned on. Therefore, a data voltage of the data line DLj may be applied to the first node N1 through the second transistor T2, the first transistor T1, and the third transistor T3, which are in a turn-on state. The voltage of the first node N1 may be a compensation voltage obtained by subtracting a threshold voltage of the first transistor T1 from the data voltage. The storage capacitor Cst may maintain a difference between the second power voltage ELVDD and the compensation voltage.

At a time t5*a*, as a scan signal of a turn-on level (e.g., a low level) is applied to the second scan line GBi, the seventh transistor T7 and the eighth transistor T8 may be turned on. As the seventh transistor T7 is turned on, the anode initialization voltage VAINT may be applied to the anode of the light emitting element LD, and the light emitting element LD may be initialized to a charge quantity corresponding to a voltage difference between the anode initialization voltage VAINT and the first power voltage ELVSS. Accordingly, low grayscale expression of the light emitting element LD can be readily performed.

In addition, as the eighth transistor T8 is turned on, a voltage of the second node N2 may be set as the bias voltage VOBS. Accordingly, because the bias voltage VOBS is applied to a source electrode of the first transistor T1, a hysteresis phenomenon may be prevented (or the likelihood of hysteresis occurring may be substantially reduced), and an on-bias state can be ensured.

At a time t6*a*, as an emission signal of a turn-on level (e.g., a low level) is applied to the emission line EMi, the fifth transistor T5 and the sixth transistor T6 may be turned on. Therefore, a path of driving current may be formed, which flows toward the first power voltage ELVSS from the second power voltage ELVDD via the fifth transistor T5, the first transistor T1, the sixth transistor T6, and the light emitting element LD.

An amount of driving current may be adjusted according to a voltage maintained in the storage capacitor Cst. The light emitting element LD may emit light with a luminance corresponding to the amount of driving current. The light emitting element LD may emit light until before the emission signal of the turn-off level is applied to the emission line EMi.

Figure 6:
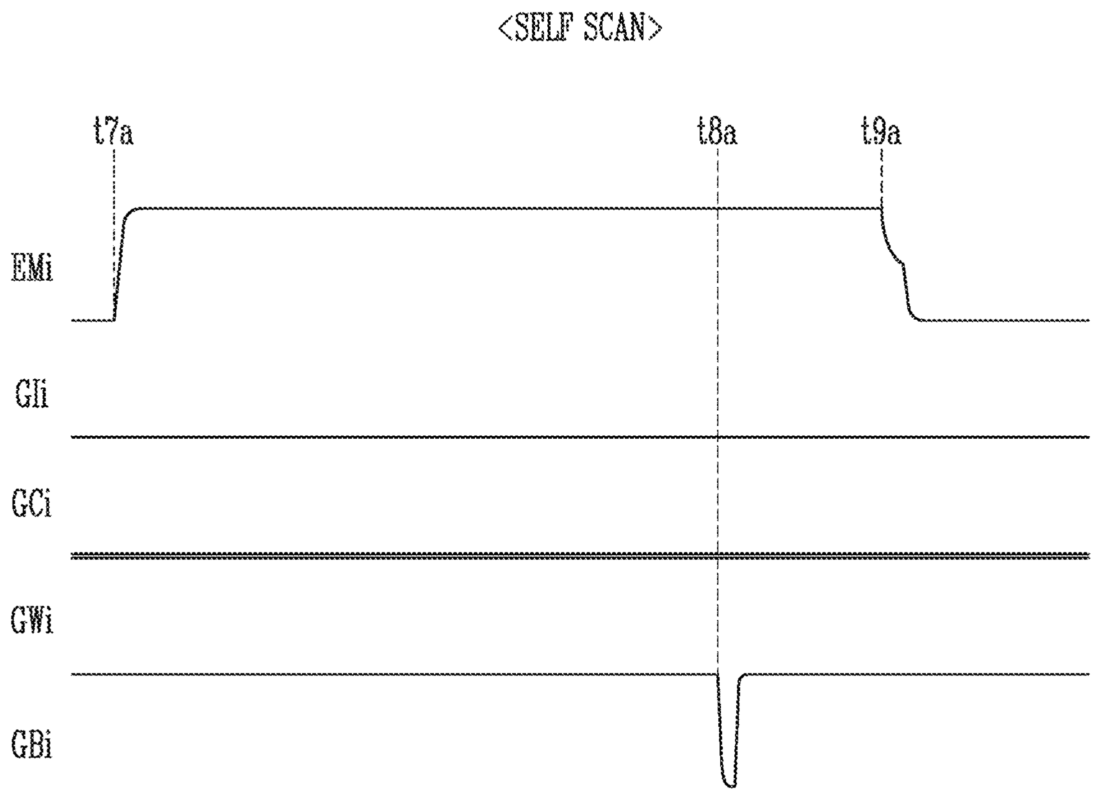
FIG. 6 is a diagram illustrating a self-scan period according to some embodiments of the present disclosure.

FIG. 6 is a diagram illustrating a self-scan period according to some embodiments of the present disclosure.

Referring to FIGS. 2 and 6, at a time t7*a*, as an emission signal of a turn-off level (e.g., a high level) is applied to the emission line EMi, the fifth transistor T5 and the sixth transistor T6 may be turned off, so that the pixel PXij is in the non-emission state.

During a period t7*a* to t8*a*, scan signals of a turn-off level may be maintained in the first scan line GWi, the third scan line GIi, and the fourth scan line GCi. Therefore, the voltage of the first node N1 is not changed.

At a time t8*a*, as a scan signal of a turn-on level (e.g., a low level) is applied to the second scan line GBi, the seventh transistor T7 and the eighth transistor T8 may be turned on. As the seventh transistor T7 is turned on, the anode initialization voltage VAINT may be applied to the anode of the light emitting element LD, and the light emitting element LD may be initialized to a charge quantity corresponding to the voltage difference between the anode initialization voltage VAINT and the first power voltage ELVSS. Accordingly, the low grayscale expression of the light emitting element LD can be readily implemented.

In addition, as the eighth transistor T8 is turned on, the voltage of the second node N2 may be set as the bias voltage VOBS. Accordingly, because the bias voltage VOBS is applied to the source electrode of the first transistor T1, the hysteresis phenomenon can be prevented (or the likelihood of the phenomenon occurring may be substantially reduced), and the on-bias state can be ensured.

At a time t9*a*, as an emission signal of a turn-on level (e.g., a low level) is applied to the emission line EMi, the fifth transistor T5 and the sixth transistor T6 may be turned on. Therefore, a path of driving current may be formed, which flows toward the first power voltage ELVSS from the second power voltage ELVDD via the fifth transistor T5, the first transistor T1, the sixth transistor T6, and the light emitting element LD.

An amount of driving current may be adjusted according to a voltage maintained in the storage capacitor Cst. Because the voltage of the first node N1, which is written during the address scan period AS, is maintained during the self-scan period SS, a luminance of the pixel PXij in the self-scan period SS is equal to a luminance of the pixel PXij in the address scan period AS.

Figure 7:
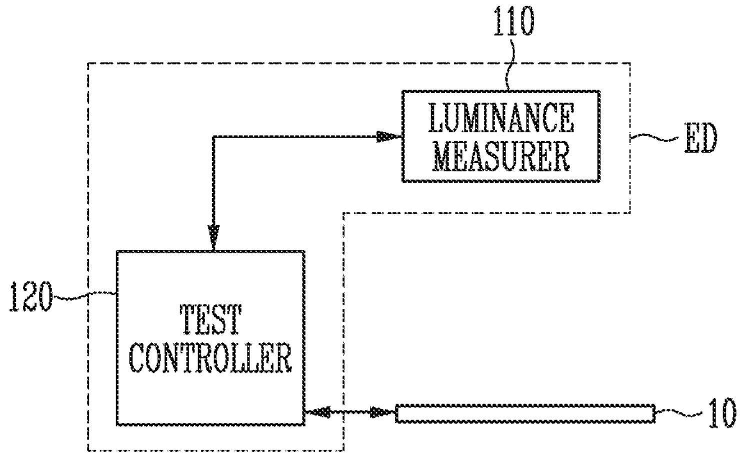
FIG. 7 is a diagram illustrating a voltage setting device according to some embodiments of the present disclosure.

FIG. 7 is a diagram illustrating a voltage setting device according to some embodiments of the present disclosure.

Referring to FIG. 7, the voltage setting device ED may include a luminance measurer 110 and a test controller 120. The test controller 120 may be configured as a general-purpose or dedicated computing device. The computing device may include a recording medium and a processor. The recording medium and the processor may be included in the physically same device, but be included in physically different devices, using a clouding technology or the like. The luminance measurer 110 may be configured as a camera or a luminance meter.

The recording medium may include data readable by the processor or suitable kinds of recording devices in which a program can be stored. Examples of the recording medium readable by the processor may be a ROM, a RAM, a CD-ROM, a magnetic tape, a floppy disk, an optical data storage, a hard disk, an external hard disk, an SSD, a USB storage device, a DVD, a blue-ray disk, and the like. Also, the recording medium readable by the processor may be a combination of a plurality of devices, and be distributed in a computer system connected to a network. The recording medium may be a non-transitory computer readable medium. The non-transitory computer readable medium means a medium readable by the processor, which does not store data or program for a short time, such as a register, a cache, and a memory, but semi-permanently stores the data or program.

The test controller 120 may provide test voltages to the display device 10, or control the display device 10 to generate test voltages. The luminance measurer 110 may photograph an image displayed by the display device 10 or measure a luminance, based on the test voltages.

The test controller 120 may set, to voltage values of the display device 10, test voltages determined to be suitable for the display device 10. The set voltage values may be stored in a memory of the display device 10.

Figure 8:
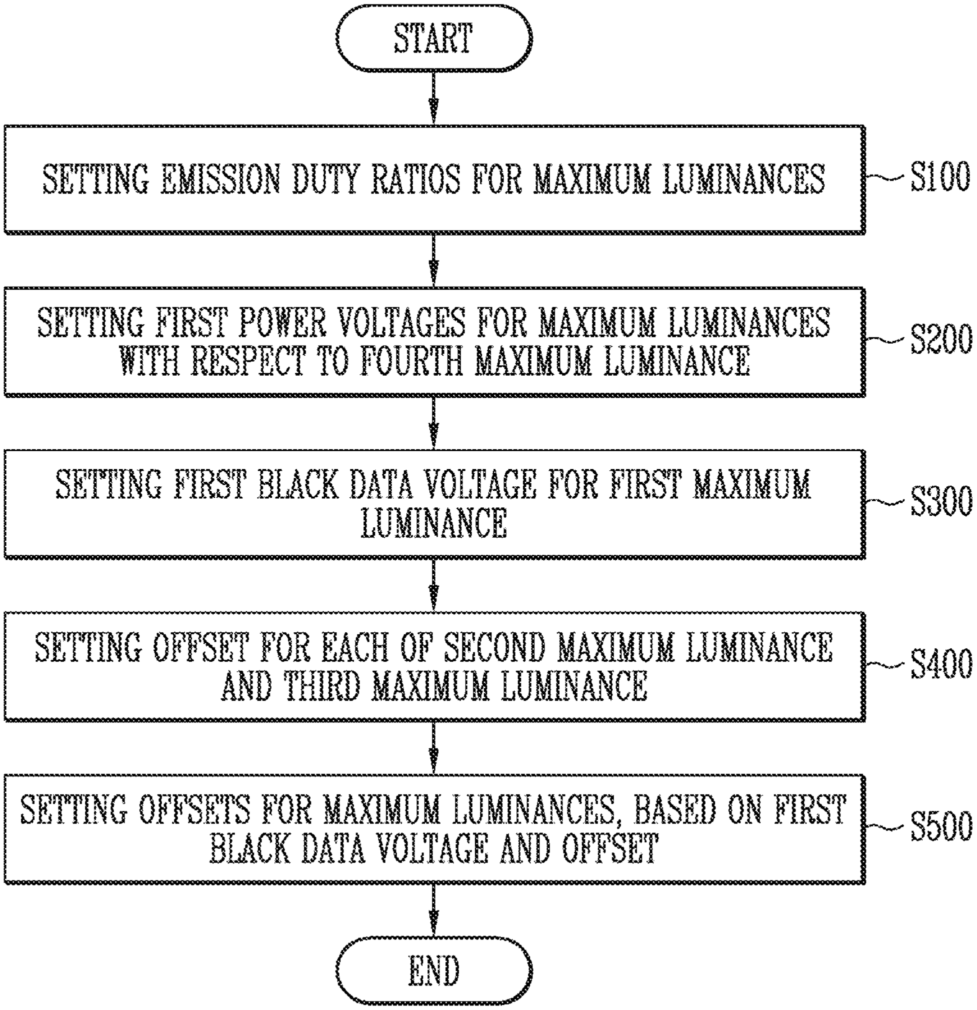
FIG. 8 is a flowchart illustrating a voltage setting method for the display device according to some embodiments of the present disclosure.
Figure 10:
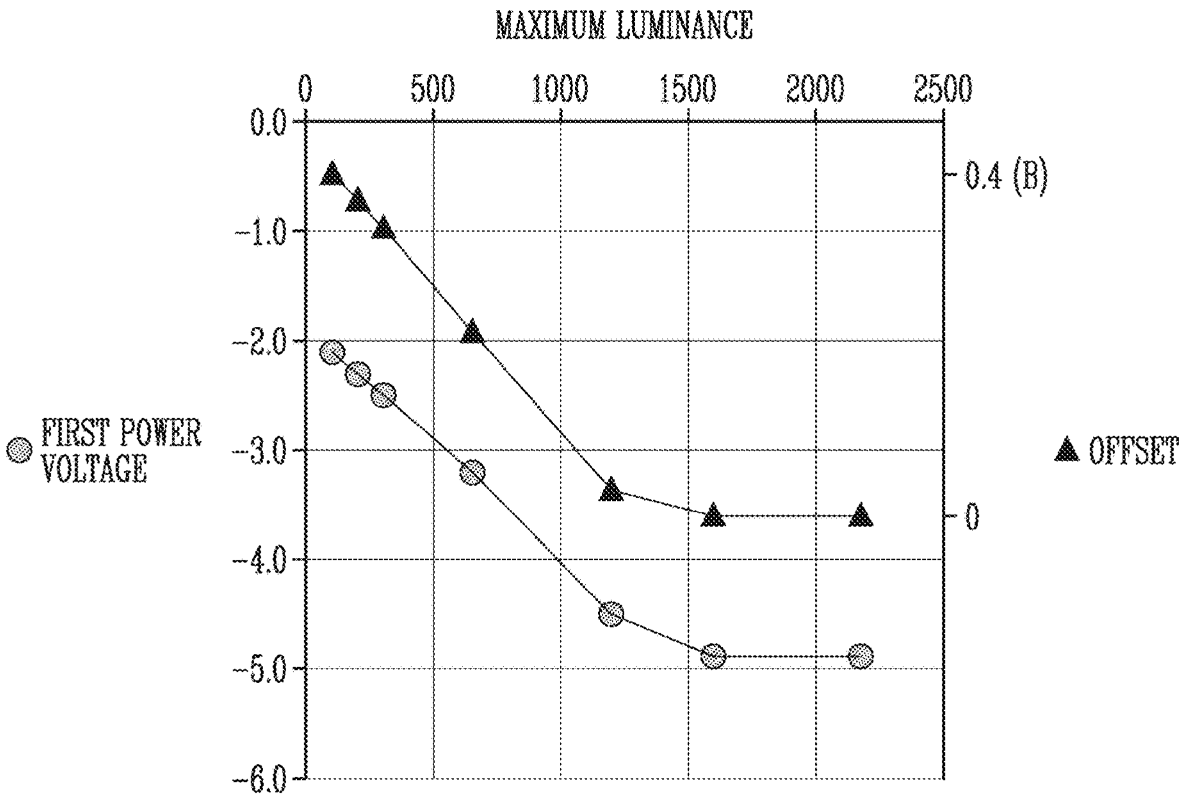
Figure 11:
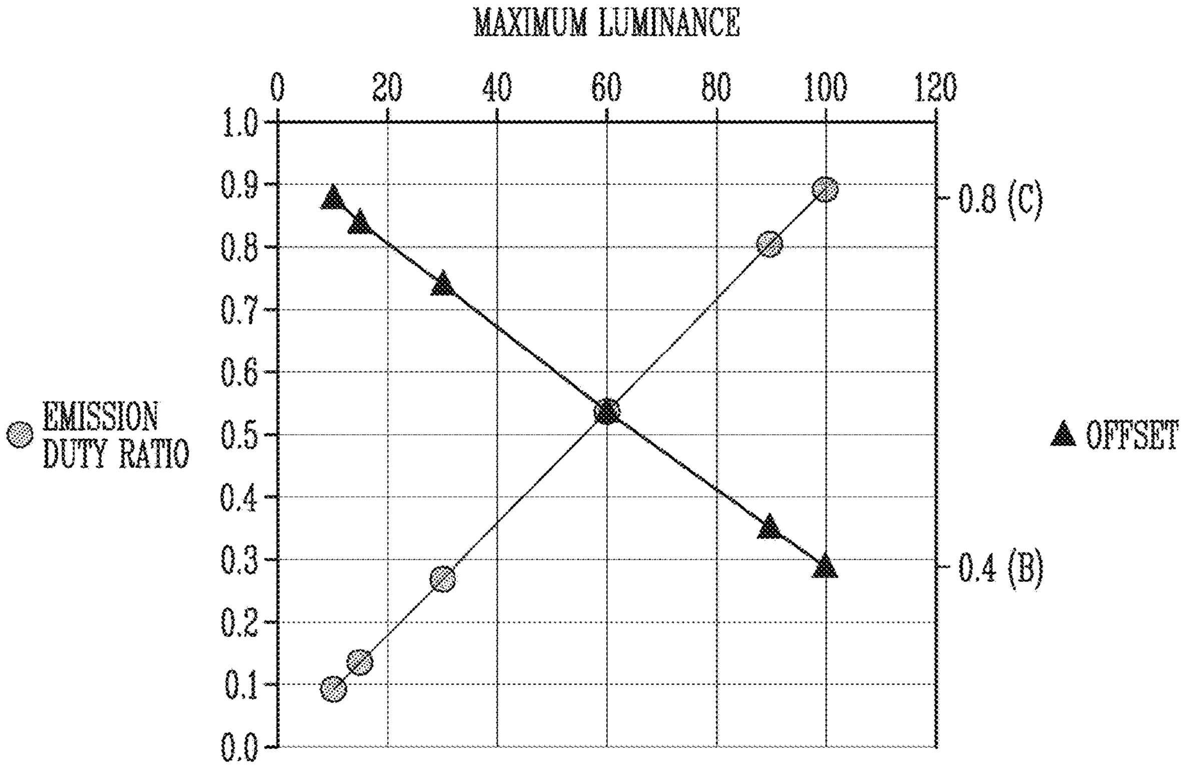

FIG. 8 is a flowchart illustrating a voltage setting method for the display device according to some embodiments of the present disclosure. FIGS. 9 to 11 are diagrams illustrating the voltage setting method shown in FIG. 8 according to some embodiments of the present disclosure.

Referring to FIGS. 1 and 7 to 11, the voltage setting method shown in FIG. 8 may be performed in the voltage setting device ED shown in FIG. 7 and/or the display device 10 shown in FIG. 1.

The display device 10 may display an image, based on a maximum luminance selected among maximum luminances (e.g., ranging from about 4 nits to about 2175 nits). As described above, the maximum luminance may be manually set by manipulation of a user on the display device 10, or be automatically set by an algorithm linked with an illumination sensor or the like. Even with respect to the same grayscale, a data voltage may vary according to the maximum luminance, and therefore, an emission luminance of the pixel may also vary.

However, when various voltages are tested one by one with respect to the maximum luminances (e.g., about 4 nits to about 2175 nits), the process may take an undesirable amount of time, and therefore, an efficient voltage setting method is desirable.

First, the voltage setting device ED or the display device 10 may set emission duty ratios for the maximum luminances (e.g., about 4 nits to about 2175 nits) (S100). An emission duty ratio is not tested by the voltage setting device ED, but may be stored as a set value (e.g., a predetermined value) in the memory of the display device 10.

The emission duty ratio represents, as a ratio, a period in which each pixel PXij emits light for one frame period (e.g., a ratio between an amount of time during which light is emitted and a total time of one frame period). For example, when light emits during 80% of the one frame period, the emission duty ratio may be 80%. In another example, when emits light during 5% of the one frame period, the emission duty ratio may be 5%. Referring to FIG. 5, when the emission signal applied to the emission line EMi has a low level, the fifth transistor T5 and the sixth transistor T6 may be turned on, and a driving current may be supplied to the light emitting element LD. Therefore, in the case of the display device 10 including the pixel PXij shown in FIG. 2, a ratio of a period in which the emission signal has the low level during one frame period may become the emission duty ratio.

With respect to at least some of maximum luminances (e.g., about 4 nits to about 100 nits) in a first luminance period, which are smaller than or equal to a second maximum luminance ML2, different emission duty ratios (8.92% to 89.19%) may be set. For example, with respect to the maximum luminances (4 nits to 100 nits) in the first luminance period, which are smaller than or equal to the second maximum luminance ML2, the emission duty ratio (8.92% to 89.19%) may be set smaller as the maximum luminance becomes smaller. Therefore, in the case of the maximum luminances (4 nits to 100 nits) in the first luminance period, the luminance of the display device 10 may be adjusted using the emission duty ratio even when differences between second power voltages ELVDD and first power voltages ELVSS are the same or substantially the same. The same or substantially the same emission duty ratio (e.g., about 8.92%) may be set for some adjacent maximum luminances (e.g., 4 nits and 10 nits).

For example, with respect to maximum luminances (100 nits to 2175 nits) in a second luminance period, which are larger than or equal to the second maximum luminance ML2, the same or substantially the same emission duty ratio (e.g., about 89.19%) may be set. The same emission or substantially the same duty ratio may be another set value (e.g., about 89.19%) among the set emission duty ratios (e.g., about 8.92% to about 89.19%).

As such, the second maximum luminance ML2 may be a boundary luminance between the maximum luminances (e.g., about 4 nits to about 100 nits) for which the luminance may be adjusted using the emission duty ratio and the maximum luminances (e.g., about 100 nits to about 2175 nits) for which the luminance is adjusted using the first power voltage ELVSS, and may be determined as an appropriate maximum luminance (e.g., 100 nits) by considering power consumption, emission efficiency, and the like. In some embodiments, the second power voltage ELVDD may have a fixed value.

Next, the voltage setting device ED may set first power voltages ELVSS for the maximum luminances (e.g., about 4 nits to about 2175 nits) with respect to a fourth maximum luminance ML4 (S200). For example, the fourth maximum luminance ML4 may be set (e.g., preset or predetermined) as a maximum luminance (e.g., about 650 nits) when the user of the display device 10 most frequently uses.

The voltage setting device ED may perform a test on the fourth maximum luminance ML4. The test may mean a test of changing a test voltage (or a voltage to be set), using the test controller 120, while measuring a luminance (or display luminance) of an image displayed in the display device 10, using the luminance measurer 110. For example, the test controller 120 may control the display device 10 to display a white image, and change the first power voltage ELVSS such that a luminance measured by luminance measurer 110 becomes about 650 nits.

Even with respect to display devices 10 of the same model, magnitudes of first power voltages ELVSS for expressing the fourth maximum luminance ML4 may be different from each other according to a process variation. For example, the process variation may exist according to positions on a mother substrate, and magnitudes of first power voltages ELVSS required to express the fourth maximum luminance ML4 may be different from each other even with respect to display devices 10 of the same model. Therefore, the first power voltage ELVSS may be set in a range (a minimum value to a maximum value) which can satisfy a plurality of display devices 10 with respect to the fourth maximum luminance ML4. The minimum value and the maximum value are based on an absolute value of a numerical value. In each of the display devices 10, a first power voltage ELVSS may be individually set within the set range with respect to the fourth maximum luminance ML4.

The voltage setting device ED may not perform any additional test on other maximum luminances (4 nits to 300 nits and 1200 nits to 2175 nits) except the fourth maximum luminance ML4. The voltage setting device ED may add or subtract an offset value to or from the determined first power voltage ELVSS for the fourth maximum luminance ML4, thereby determining first power voltages ELVSS for the other maximum luminances (4 nits to 300 nits and 1200 nits to 2175 nits).

With respect to at least some of the maximum luminances (100 nits to 2175 nits) in the second luminance period, which are larger than or equal to the second maximum luminance ML2, different first power voltages ELVSS may be set. For example, with respect to the maximum luminances (100 nits to 2175 nits) in the second luminance period, which are larger than or equal to the second maximum luminance ML2, the first power voltage ELVSS may be set larger as the maximum luminance becomes larger. The magnitude of the first power voltage ELVSS is based on an absolute value. Therefore, in the case of the maximum luminances (100 nits to 2175 nits) in the second luminance period, the luminance of the display device 10 may be adjusted using differences between second power voltages ELVDD and first power voltages ELVSS even with respect to the same or substantially the same emission duty ratio. The same or substantially the same first power voltage ELVSS may be set for some adjacent maximum luminances (e.g., 1600 nits to 2175 nits).

With respect to the maximum luminances (4 nits to 100 nits) in the first luminance period, which are smaller than or equal to the second maximum luminance ML2, the same or substantially the same first power voltage ELVSS may be set.

Next, the voltage setting device ED may set a first black data voltage (or black data voltage) for a first maximum luminance ML1 (S300). The first maximum luminance ML1, the second maximum luminance ML2, a third maximum luminance ML3, and the fourth maximum luminance ML4 may be different from one another. For example, the first maximum luminance ML1 may be larger than each of the second maximum luminance ML2, the third maximum luminance ML3, and the fourth maximum luminance ML4. With respect to the brightest maximum luminance (e.g., about 2175 nits) among the luminances (e.g., about 4 nits to about 2175 nits), black image expression may be weakest (i.e., black floating may easily occur). Therefore, the first maximum luminance ML1 may be desirably set as the brightest luminance (e.g., 2175 nits).

For example, the voltage setting device ED may set the first black data voltage (e.g., "A" shown in FIG. 9) for the first maximum luminance ML1 such that a black image is displayed by repeatedly testing arbitrary black data voltages (e.g., about 4.5 V to about 6.0 V) for the first maximum luminance ML1. For example, the voltage setting device ED may check whether the luminance of the black image becomes a reference luminance (e.g., about 0.001 nit or less) while gradually increasing the arbitrary black data voltage from about 4.5 V. When the luminance of the black image is decreased to the reference luminance or less, the voltage setting device ED may determine a corresponding arbitrary black data voltage as the first black data voltage for the first maximum luminance ML1. Because the luminance measuring time of the luminance measurer 110 is decreased as a display image becomes brighter, it is advantageous to test the arbitrary black data voltage by gradually increasing the arbitrary black data voltage from a relatively low value to a relatively high value (e.g., a minimum value to a maximum value).

In some embodiments, the first black data voltage may be equally set in pixels emitting lights of different colors. For example, the pixel unit 140 shown in FIG. 1 may include first pixels emitting light of a first color (e.g., red), second pixels emitting light of a second color (e.g., green), and third pixels emitting light of a third color (e.g., blue). In the first maximum luminance ML1, the first pixels, the second pixels, and the third pixels may be set to have the same or substantially the same black data voltage.

Next, the voltage setting device ED may set an offset for each of the second maximum luminance ML2 and the third maximum luminance ML3 while measuring a display luminance (S400). The offset may be a difference between the first black data voltage for the first maximum luminance ML1 and a black data voltage for a corresponding maximum luminance. For example, when an offset for a corresponding luminance is applied to the first black data voltage for the first maximum luminance ML1, a black data voltage for the corresponding luminance may be acquired. That the offset is applied to the first black data voltage for the first maximum luminance ML1 may mean that offsets are added to or subtracted from the first black data voltage for the first maximum luminance ML1. Each of the offsets may have a value of 0 or more.

For example, the voltage setting device ED may determine arbitrary black data voltages for the second maximum luminance ML2, based on offsets (e.g., arbitrary offsets) in a lookup table LUT shown in FIG. 12, and determine a second black data voltage (e.g., black data voltage) for the second maximum luminance ML2 such that a black image is displayed by repeatedly testing the arbitrary black data voltages. A second offset (e.g., offset) (e.g., "B" shown in FIG. 9) for the second maximum luminance ML2 may be determined according to the second black data voltage. Similarly, the voltage setting device ED may determine arbitrary black data voltages for the third maximum luminance ML3, based on the offsets (e.g., arbitrary offsets) in the lookup table LUT shown in FIG. 12, and determine a third black data voltage (e.g., black data voltage) for the third maximum luminance ML3 such that a black image is displayed by repeatedly testing the arbitrary black data voltages. A third offset (e.g., offset) (e.g., "C" shown in FIG. 9) for the third maximum luminance ML3 may be determined according to the third black data voltage.

A configuration of setting an offset for the second maximum luminance ML2 and the third maximum luminance ML3 will be described in detail with reference to FIGS. 12 to 14.

In some embodiments, the second maximum luminance ML2 and the third maximum luminance ML3 may correspond to the first luminance period in which an emission duty ratio is differently set according to a maximum luminance. For example, the second maximum luminance ML2 and the third maximum luminance ML3 may correspond to a boundary of the first luminance period. At least one maximum luminance for which the smallest emission duty ratio (e.g., about 8.92%) among the emission duty ratios is set may be set as the third maximum luminance ML3. When the number of the at least one maximum luminance (e.g., about 4 nits and about 10 nits) is two or more, the largest maximum luminance (e.g., about 10 nits) among the at least one maximum luminance (e.g., about 4 nits and about 10 nits) may be set to the third maximum luminance ML3.

Next, the voltage setting device ED or the display device 10 may set offsets for remaining maximum luminances except the first, second, and third maximum luminances ML1, ML2, and ML3 among the luminances (e.g., about 4 nits to about 2175 nits), based on the first black data voltage for the first maximum luminance ML1, the second offset for the second maximum luminance ML2, and the third offset for the third maximum luminance ML3 (S500). Any additional test may not be performed on the remaining maximum luminances.

In some embodiments, in setting of offsets for maximum luminances (e.g., about 200 nits to about 1600 nits) in the second luminance period, which are smaller than the first maximum luminance ML1 and are larger than the second maximum luminance ML2, the voltage setting device ED or the display device 10 may perform first interpolation on a first offset for the first maximum luminance ML1 and a second offset for the second maximum luminance ML2. For example, the voltage setting device ED or the display device 10 may perform the first interpolation based on first power voltages, using the first offset and the second offset.

As described above, the first offset for the first maximum luminance may be 0. A case where the second offset for the second maximum luminance ML2 is set to about 0.4 (i.e., B=0.4) through luminance measurement is assumed. Offsets for the maximum luminances (e.g., about 200 nits to about 1600 nits) may be set to values between 0 and 0.4.

The first interpolation may be performed to be in proportion to a difference between first power voltages ELVSS of corresponding maximum luminances. Referring to FIG. 10, it can be seen that a graph of offsets shows a tendency similar to a graph of first power voltages ELVDD for maximum luminances.

For example, an offset form a target maximum luminance (e.g., one of about 200 nits to about 1600 nits) in the second luminance period may be derived by Equation 1.

$$OFFSET\_X1 = OFFSET\_2175 + (ELVSS\_X1 - ELVSS\_2175) * (OFFSET\_100 - OFFSET\_2175) / (ELVSS\_100 - ELVSS\_2175) \quad \text{Equation 1}$$

OFFSET_X1 may be the offset for the target maximum luminance in the second luminance period. OFFSET_2175 may be the first offset for the first maximum luminance ML1. For example, the first offset may be 0. ELVSS_X1 may be a first power voltage ELVSS of the target maximum luminance. The first power voltage ELVSS of the target maximum luminance may be set (e.g., preset or predetermined) in the step S200. ELVSS_2175 may be a first power voltage ELVSS of the first maximum luminance ML1. The first power voltage ELVSS of the first maximum luminance ML1 may be predetermined in the step S200. OFFSET_100 may be the second offset for the second maximum luminance ML2. The second offset may be determined through luminance measurement before the first interpolation in the step S400. ELVSS_100 may be a first power voltage ELVSS of the second maximum luminance ML2. The first power voltage ELVSS of the second maximum luminance ML2 may be predetermined in the step S200.

In some embodiments, in setting of offsets for maximum luminances (e.g., about 15 nits to about 90 nits) in the first luminance period, which are smaller than the second maximum luminance ML2 and are larger than the third maximum luminance ML3, the voltage setting device ED or the display device 10 may perform second interpolation on the second offset for the second maximum luminance ML2 and the third offset for the third maximum luminance ML3. For example, the voltage setting device ED or the display device 10 may perform the second interpolation based on emission duty ratios, using the second offset and the third offset.

A case where the second offset for the second maximum luminance ML2 is set to about 0.4 (i.e., B=0.4) and the third offset for the third maximum luminance ML3 is set to about 0.8 (i.e., C=0.8) through luminance measurement is assumed. Offsets for the maximum luminances (e.g., about 4 nits to about 90 nits) may be set to values between about 0.4 and about 0.8.

The second interpolation may be performed to be in proportion to a difference between emission duty ratios of maximum luminances. That is, because the maximum luminances (e.g., about 15 nits to about 90 nits) which becomes targets of the second interpolation are set to have the same or substantially the same first power voltage ELVSS, interpolation cannot be performed to be in proportion to a difference between first power voltages ELVSS. Therefore, unlike the first interpolation, the second interpolation may be preferably performed to be in proportion to the difference between the emission duty ratios. With respect to maximum luminances (e.g., about 4 nits to about 10 nits) having the same or substantially the same emission duty ratio, the same or substantially the same offset may be set.

Referring to FIG. 11, it can be seen that a graph of offsets shows a tendency similar to a graph of emission duty ratios for maximum luminances. However, when the slope of the graph of offsets is a negative number, the slope of the graph of emission duty ratios may be a positive number, and signs of the slopes may be opposite to each other. For example, in FIG. 11, it is illustrated that the third offset for the third maximum luminance ML3 is larger than the second offset for the second maximum luminance ML2. However, this is merely illustrative, and the present disclosure is not limited thereto. For example, the third offset for the third maximum luminance ML3 may be smaller than the second offset for the second maximum luminance ML2.

For example, an offset for a target maximum luminance (e.g., one of about 15 nits to about 90 nits) in the first luminance period may be derived by Equation 2.

$$OFFSET\_X2 = OFFSET\_100 + (AOR\_X2 - AOR\_100) * (OFFSET\_10 - OFFSET\_100) / (AOR\_10 - AOR\_100) \quad \text{Equation 2}$$

OFFSET_X2 may be the offset for the target maximum luminance in the first luminance period. OFFSET_100 may be the second offset for the second maximum luminance ML2. The second offset for the second maximum luminance ML2 may be determined through luminance measurement before the first interpolation in the step S400. AOR_X2 may be an emission duty ratio of the target maximum luminance. The emission duty ratio of the target maximum luminance may be set (e.g., preset or predetermined) in the step S100. AOR_100 may be an emission duty ratio of the second maximum luminance ML2. The emission duty ratio of the second maximum luminance ML2 may be set (e.g., preset or predetermined) in the step S100. OFFSET_10 may be the third offset for the third maximum luminance ML3. The third offset for the third maximum luminance ML3 may be determined through luminance measurement before the second interpolation in the step S400. AOR_10 may be an emission duty ratio of the third maximum luminance ML3. The emission duty ratio of the third maximum luminance ML3 may be set (e.g., preset or predetermined) in the step S100.

In some embodiments, the voltage setting method shown in FIG. 8 may further include an additional step after the step S500. For example, the additional step may be a step of adding a margin value to the first black data voltage for the first maximum luminance ML1. For example, the margin value may be about 0.3 V. When the first black data voltage for the first maximum luminance ML1 is determined as about 5.6 V in the step S300, the first black data voltage for the first maximum luminance ML1 may be adjusted to about 5.9 V in the additional step.

For example, black data voltages of the maximum luminances (e.g., about 4 nits to about 1600 nits) may be determined by adding a corresponding offset (i.e., offsets acquired through a test or an interpolation) to the first black data voltage of the first maximum luminance ML1. Therefore, according to the additional step, margin values for black data voltages may be further added in all maximum luminances. Thus, the black floating can be more effectively prevented or the likelihood of black floating occurring may be substantially reduced.

As described above, in the voltage setting method in accordance with the embodiments of the present disclosure, offsets for each of the second maximum luminance ML2 and the third maximum luminance ML3, which correspond to the first luminance period in which the emission duty ratio is differently set, may be set through a test in addition to that the first black data voltage for the first maximum luminance ML1 is set through a test. Thus, an offset for the second maximum luminance ML2 and the third maximum luminance ML3 (and another maximum luminance) is set largest, a desirable black data voltage close to an operating point of the light emitting element is set according to the offset, and the power consumption of the display device 10 can be reduced.

Also, in the voltage setting method, an offset for a maximum luminance in the first luminance period is set by performing the first interpolation, based on the emission duty ratio, an offset for a maximum luminance in the second luminance period is set by performing the second interpolation, based on first power voltage. Thus, the black floating can be prevented (or the likelihood substantially reduced) even when the power voltage and the emission duty ratio is changed according to the maximum luminance.

FIG. 12 is a diagram illustrating an offset according to some embodiments of the present disclosure. FIG. 13 is a diagram illustrating a black data voltage according to the offset shown in FIG. 12 according to some embodiments of the present disclosure. FIG. 14 is a flowchart illustrating some embodiments in which an offset is set in the voltage setting method shown in FIG. 8 according to some embodiments of the present disclosure.

Figure 13:
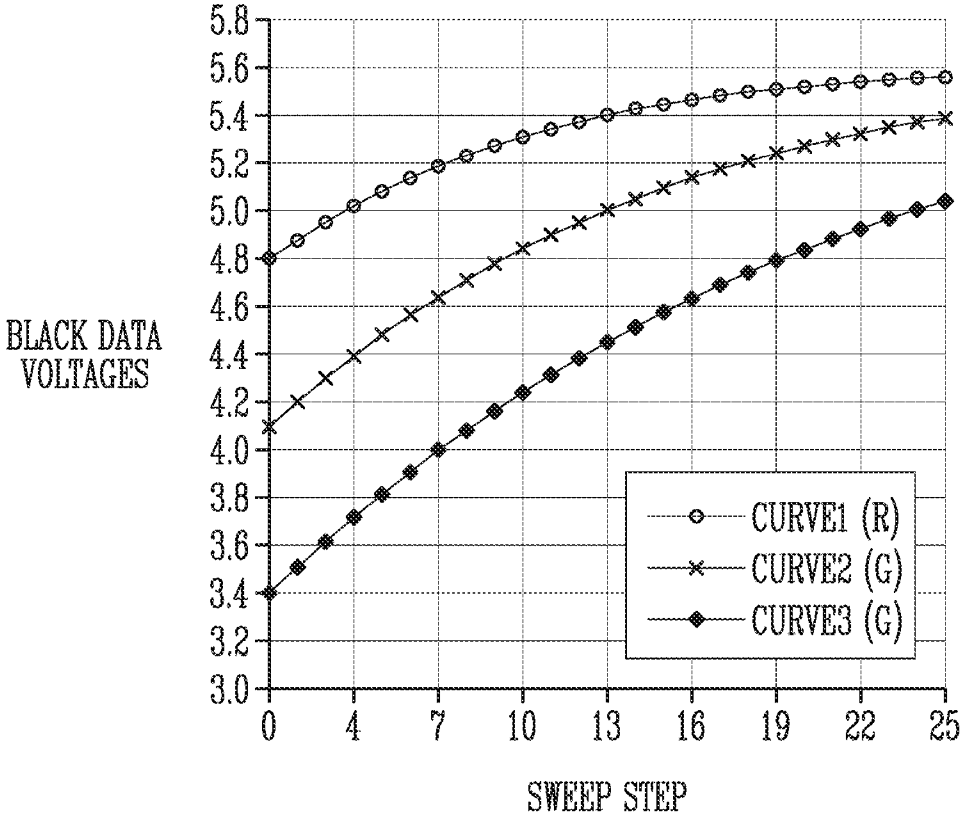
FIG. 13 is a diagram illustrating a black data voltage according to the offset shown in FIG. 12 according to some embodiments of the present disclosure.

First, referring to FIGS. 12 and 13, the lookup table LUT may include an offset (e.g., arbitrary offset). Offsets of the lookup table LUT may be differently set for pixels emitting lights of different colors. This is because operating points of a light emitting element in a pixel are different from one another with respect to colors. The offset of the lookup table LUT may be set by considering a material or characteristic of the display device 10, required performance (e.g., an error or change in luminance/color coordinate in frequency change), and the like. An offset for a first pixel emitting light of a first color (e.g., red (R)), an offset for a second pixel emitting light of a second color (e.g., green (G)), and an offset for a third pixel emitting light of a third color (e.g., blue (B)) may be set while forming pars for each sweep step. Offsets according to sweep steps are the same or substantially the same as shown in FIG. 12, and therefore, description of each of the offsets according to the sweep steps will be omitted. As the sweep steps become larger, the offsets may become smaller, but the present disclosure is not limited thereto.

In the step S400 shown in FIG. 8, the voltage setting device ED may perform the test while sweeping the offsets according to the sweep steps. When a specific sweep step is selected, black data voltages, i.e., arbitrary black data voltages for the test may be determined by offsets according to the specific sweep step. A case where the first black data voltage for the first maximum luminance ML1 is set to about 5.6 V in the step S300 shown in FIG. 8 is assumed (see, e.g., CASE1 in FIG. 12). For example, when an offset for the first pixel according to a first sweep step is 0.8, a black data voltage (e.g., arbitrary black data voltage) for the first pixel according to the first sweep step may be about 4.8 V. Black data voltages according to the sweep steps are the same or substantially the same as shown in FIGS. 12 and 13, and description of each of the black data voltages according to the sweep steps will be omitted.

Referring to FIG. 13, as the sweep steps become larger, the black data voltages may be set to be gradually increased. For example, the black data voltage for the first pixel may be increased from about 4.8 V to about 5.6 V according to a first curve CURVE1. A black data voltage for the second pixel may be increased from about 4.1 V to about 5.4 V according to a second curve CURVE2. A black data voltage for the third pixel may be increased from about 3.4 V to about 5.1 V according to a third curve CURVE3.

Figure 14:
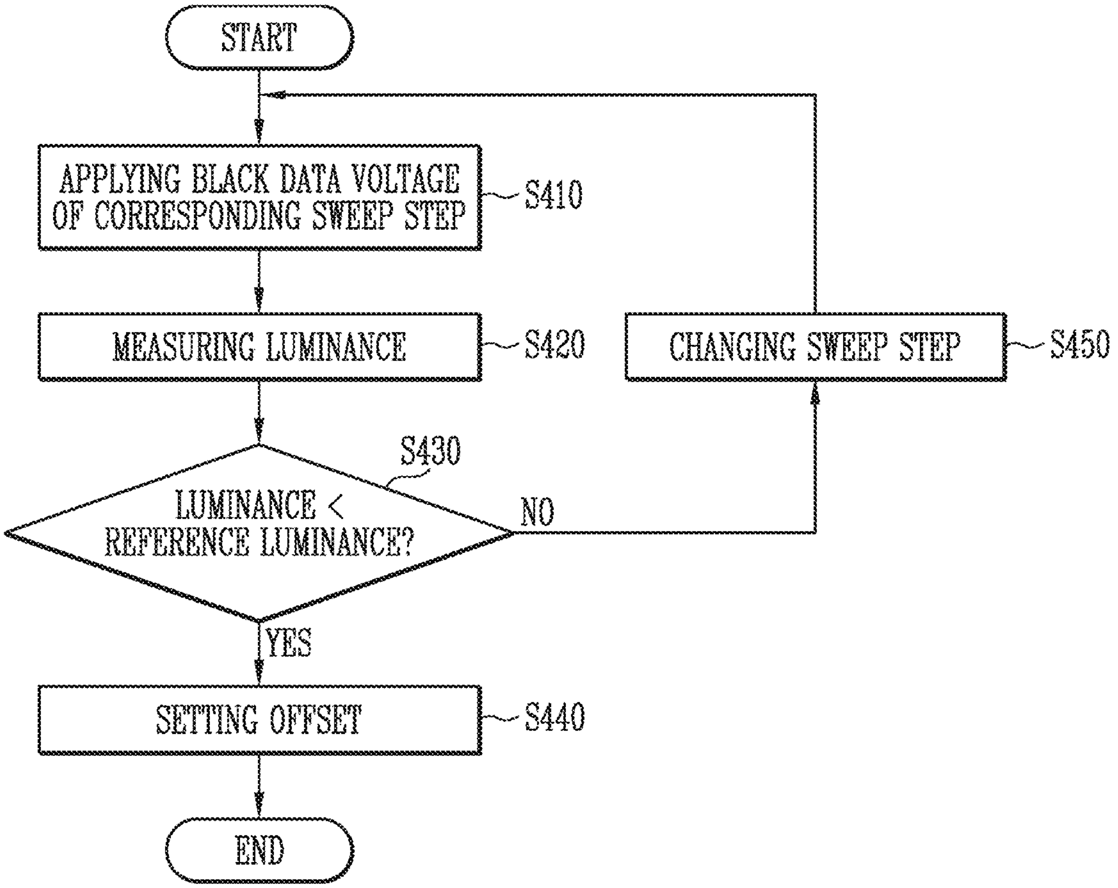
FIG. 14 is a flowchart illustrating some embodiments in which an offset is set in the voltage setting method shown in FIG. 8 according to some embodiments of the present disclosure.

Referring to FIG. 14, the voltage setting device ED may select one sweep step among the sweep steps, and apply a black data voltage of the selected sweep step (e.g., the corresponding sweep step) to the display device 10 (S410). For example, the voltage setting device ED may select a first sweep step, provide the first pixel with a black data voltage (e.g., about 4.800 V) corresponding to an offset (e.g., about 0.800) for the first pixel of the first sweep step, provide the second pixel with a black data voltage (e.g., about 4.100 V) corresponding to an offset (1.500) for the second pixel of the first sweep step, and provide the third pixel with a black data voltage (e.g., about 3.400 V) corresponding to an offset (e.g., about 2.200) for the third pixel of the first sweep step. That is, the voltage setting device ED may apply, to the display device 10, an arbitrary black data voltage corresponding to an arbitrary offset selected for the test among the arbitrary offsets in the lookup table LUT.

After that, the voltage setting device ED may measure a display luminance according to the arbitrary black data voltage (S420), and determine whether the display luminance according to the arbitrary black data voltage is smaller than a reference luminance (S430). The reference luminance may be 0.001 nit, but the present disclosure is not limited thereto.

When the display luminance is smaller than the reference luminance, the voltage setting device ED may set offsets of the corresponding sweep step as offsets for a corresponding maximum luminance (S440).

In some embodiments, when the display luminance is larger than or equal to the reference luminance, the voltage setting device ED may change the sweep step. For example, the voltage setting device ED may change the sweep step from the first sweep step to a second sweep step. That is, the voltage setting device ED may change the offset to the arbitrary offset for the test (S450), and re-perform the test.

In some embodiments, the voltage setting device ED may perform the test while increasing the sweep step. As the sweep step is increased, the magnitude of the offset may become smaller and the magnitude of the black data voltage may become larger. That is, as the sweep step is increased, the luminance may be increased. That is, the voltage setting device ED may perform the test while sequentially selecting the arbitrary offset for the test in an order from a high luminance to a low luminance. For example, the voltage setting device ED may perform the test according to the first sweep step, perform the test according to the second sweep step, and then perform the test according to a third sweep step.

In some embodiments, the voltage setting device ED may change the sweep step through machine learning (e.g., AI learning). For example, the volage setting device ED may perform machine learning on a display luminance (i.e., the display luminance measured in the step S420) (and a color coordinate) according to the sweep step and a finally selected sweep step (i.e., the sweep step corresponding to the step S440), and change the sweep step, using a machine learning result. For example, the voltage setting device ED may perform the test according to the first sweep step, and then perform the test according to a seventh sweep step (skipping the second sweep step to a sixth sweep step) by considering the display luminance of the first sweep step. Thus, the time required to set the offset for the corresponding maximum luminance can be reduced.

Figure 15:
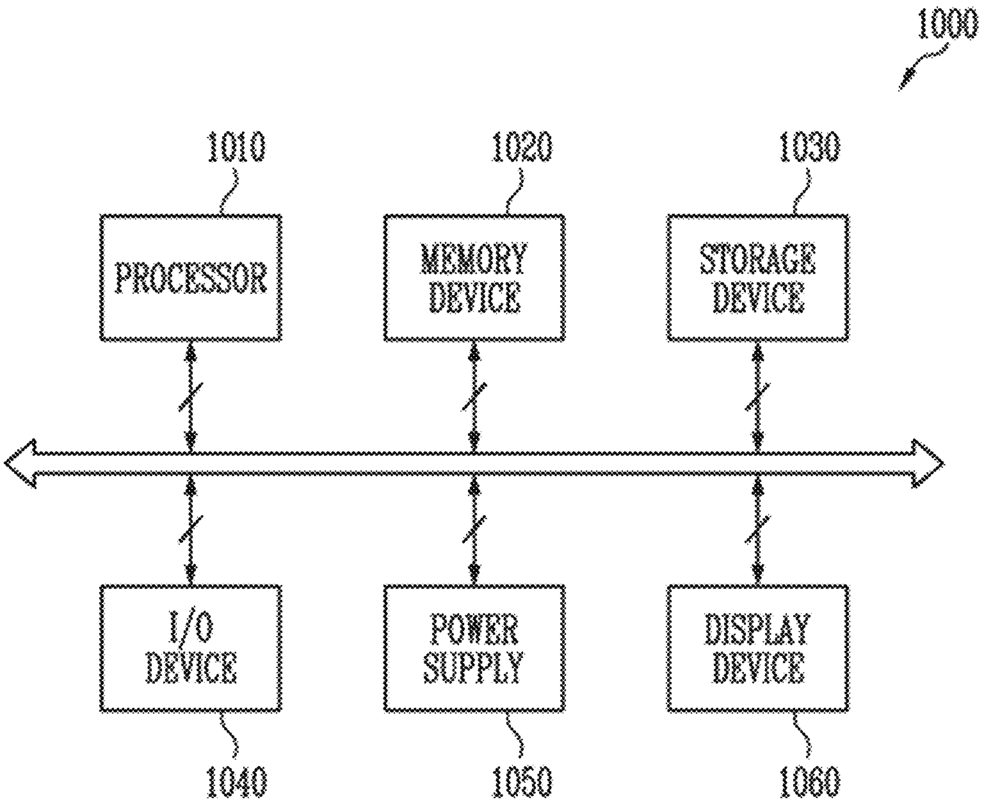
FIG. 15 is a schematic block diagram illustrating an electronic device including a display device according to some embodiments of the present disclosure.

FIG. 15 is a schematic block diagram illustrating an electronic device 1000 including a display device according to some embodiments of the present disclosure.

Referring to FIG. 15, the electronic device 1000 may include a processor 1010, a memory device 1020, a storage device 1030, an input/output (I/O) device 1040, a power supply 1050, and a display device 1060. The display device 1060 may be the display device 10 of FIG. 1. The electronic device 1000 may further include various ports for communication with a video card, a sound card, a memory card, a USB device, or other systems. In some embodiments, the electronic device 1000 may be a smartphone. In some embodiments, the electronic device 1000 may be a tablet computer. However, the aforementioned examples are illustrative, and the electronic device 1000 is not necessarily limited to the aforementioned examples. For example, the electronic device 1000 may be a cellular phone, a video phone, a smart pad, a smartwatch, a navigation device for vehicles, a computer monitor, a laptop computer, a head-mounted display device, or the like.

The processor 1010 may perform specific calculations or tasks. In some embodiments, the processor 1010 may include at least one of a central processing unit, an application processor, a graphic processing unit, a communication processor, an image signal processor, a controller, or the like. The processor 1010 may be connected to other components through an address bus, a control bus, a data bus, and the like. In some embodiments, the processor 1010 may be connected to an expansion bus such as a peripheral component interconnect (PCI) bus. In some embodiments, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices, such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices, such as a keyboard, a keypad, a touchpad, a touch screen, and a mouse, and output devices such as a speaker and a printer. In some embodiments, the display device 1060 may be integrated with the I/O device 1040.

The power supply 1050 may supply power needed to perform the operation of the electronic device 1000. For example, the power supply 1050 may include a power management integrated circuit (PMIC). In some embodiments, the power supply 1050 may supply power to the display device 1060.

The display device 1060 may display images in response to image data signals and/or control signals from the processor 1010. The display device 1060 may be connected to other components through the buses or other communication links.

In the voltage setting method, the display device, and the electronic device in accordance with the present disclosure, offsets for each of a second maximum luminance and a third maximum luminance, which correspond to a first luminance period in which an emission duty ratios is differently set, are set through a test, an offset for a maximum luminance in the first luminance period is set by performing first interpolation, based on the emission duty ratio, and an offset for a maximum luminance in a second luminance period is set by performing second interpolation, based on a first power voltage. Thus, black floating can be prevented (or the likelihood substantially reduced) even when the power voltage or the emission duty ratio is changed according to the maximum luminance.

It should be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and equivalents thereof.

What is claimed is:

1. A voltage setting method for a display device displaying an image, the voltage setting method comprising:

applying a first black data voltage corresponding to a first maximum luminance of a plurality of maximum luminances to the display device while measuring a display luminance of the display device;

setting a second offset for a second maximum luminance of the plurality of maximum luminances, which corresponds to a first luminance period in which an emission duty ratio is varied, the second offset being a difference between the first black data voltage and a second black data voltage corresponding to the second maximum luminance;

setting a third offset for a third maximum luminance of the plurality of maximum luminances, which corresponds to a first luminance period in which an emission duty ratio is varied, the third offset being a difference between the first black data voltage and a third black data voltage corresponding to the third maximum luminance; and setting offsets corresponding to remaining maximum luminances except the first to third maximum luminances, based on the first black data voltage for the first maximum luminance, the second offset for the second maximum luminance, and the third offset for the third maximum luminance.

2. The voltage setting method of claim 1, further comprising:

before the first black data voltage is applied, applying first power voltages corresponding to a fourth maximum luminance, and wherein a same first power voltage is set for maximum luminances smaller than or equal to the second maximum luminance, and varying first power voltages are set for at least some of maximum luminances larger than the second maximum luminance among the maximum luminances.

3. The voltage setting method of claim 2, wherein the same emission duty ratio is set for maximum luminances larger than or equal to the second maximum luminance among the maximum luminances, and different emission duty ratios are set for at least some of maximum luminances smaller than the second maximum luminance among the maximum luminances.

4. The voltage setting method of claim 3, wherein, in setting of offsets for maximum luminances in a second luminance period, which are smaller than the first maximum luminance and are larger than the second maximum luminance, a first interpolation based on the first power voltages is performed using a first offset corresponding to the first maximum luminance and the second offset corresponding to the second maximum luminance.

5. The voltage setting method of claim 4, wherein the first interpolation is performed to be in proportion to a difference between first power voltages for the maximum luminances in the second luminance period.

6. The voltage setting method of claim 4, wherein, in setting of offsets for maximum luminances in a first luminance period, which are smaller than the second maximum luminance and are larger than the third maximum luminance, a second interpolation based on the emission duty ratio is performed using the second offset corresponding to the second maximum luminance and the third offset corresponding to the third maximum luminance.

7. The voltage setting method of claim 6, wherein the second interpolation is performed to be in proportion to a difference between emission duty ratios for the maximum luminances in the first luminance period.

8. The voltage setting method of claim 1, wherein the setting of the offset for each of the second maximum luminance and the third maximum luminance comprises:

determining arbitrary black data voltages for the second maximum luminance, based on arbitrary offsets; and determining a second black data voltage for the second maximum luminance by repeatedly testing the arbitrary black data voltages for the second maximum luminance by applying the arbitrary black data voltages to the display device and determining whether a black image is displayed, and wherein the second offset for the second maximum luminance is determined according to the second black data voltage.

9. The voltage setting method of claim 8, wherein the determining of the second black data voltage comprises:

applying an arbitrary black data voltage corresponding to an arbitrary offset selected for a test among the arbitrary offsets;

measuring a display luminance according to the arbitrary black data voltage;

determining whether the display luminance according to the arbitrary black data voltage is smaller than a reference luminance; and changing the offset to the arbitrary offset for the test when the display luminance according to the arbitrary black data voltage is larger than or equal to the reference luminance.

10. The voltage setting method of claim 9, wherein in changing the arbitrary offset, the arbitrary offset for the test is sequentially selected among the arbitrary offsets in an order from a high luminance to a low luminance.

11. The voltage setting method of claim 9, wherein, in changing of the arbitrary offset, a display luminance measured corresponding to the arbitrary offset and machine learning on the second offset are used.

12. The voltage setting method of claim 8, wherein the setting of the offset of each of the second maximum luminance and the third maximum luminance further comprises:

determining arbitrary black data voltages for the third maximum luminance, based on the arbitrary offsets; and setting a third black data voltage for the third maximum luminance by repeatedly testing the arbitrary black data voltages for the third maximum luminance such that a black image is displayed, and wherein the third offset for the third maximum luminance is determined according to the third black data voltage.

13. The voltage setting method of claim 1, wherein the display device comprises pixels emitting lights of different colors, and wherein the first black data voltage is uniformly applied to each of the pixels, and wherein the second offset corresponding to the second maximum luminance is set non-uniformly among the pixels.

14. The voltage setting method of claim 1, wherein a black data voltage corresponding to each of the maximum luminances is determined by adding a corresponding offset among the offsets to the first black data voltage.

15. The voltage setting method of claim 14, wherein a black data voltage for each of the maximum luminances is determined by adding the corresponding offset among the offsets and a margin value to the first black data voltage.

16. The voltage setting method of claim 1, wherein the first maximum luminance is larger than each of the second maximum luminance and the third maximum luminance, and is largest among the maximum luminances.

17. The voltage setting method of claim 16, wherein at least one maximum luminance for which a smallest emission duty ratio is set among emission duty ratios is set as the third maximum luminance.

18. The voltage setting method of claim 17, wherein, when a number of the at least one maximum luminance is two or more, a largest maximum luminance among the at least one maximum luminance is set as the third maximum luminance.

19. A display device comprising:

a pixel unit comprising pixels each comprising a light emitting element; and a data driver configured to provide data voltages to the pixels based on grayscales, wherein the data voltages comprise a black data voltage corresponding to a minimum grayscale among the grayscales, wherein the black data voltage is configured to be varied according to a maximum luminance, and wherein the black data voltage is set by the voltage setting method for a display device of claim 1.

20. An electronic device comprising:

a processor configured to provide input image data; and a display device configured to display an image based on the input image data, wherein the display device comprises:

a pixel unit comprising pixels each comprising a light emitting element; and a data driver configured to provide data voltages to the pixels based on grayscales, wherein the data voltages comprise a black data voltage corresponding to a minimum grayscale among the grayscales, wherein the black data voltage is configured to be varied according to a maximum luminance, and wherein the black data voltage is set by the voltage setting method for a display device of claim 1.

* * * * *